United States Patent [19]

Barrera et al.

[11] Patent Number: 5,499,204
[45] Date of Patent: Mar. 12, 1996

[54] MEMORY CACHE WITH INTERLACED DATA AND METHOD OF OPERATION

[75] Inventors: David Barrera; Dave Levitan; Bahador Rastegar; Paul C. Rossbach, all of Austin, Tex.

[73] Assignee: Motorola, Inc., Schaumburg, Ill.

[21] Appl. No.: 270,628

[22] Filed: Jul. 5, 1994

[51] Int. Cl.$^6$ ................................................ G11C 15/00
[52] U.S. Cl. ................ 365/49; 365/230.01; 365/189.02; 395/375; 395/427
[58] Field of Search .............................. 365/230.01, 49, 365/189.07, 189.02; 395/425, 375

[56] References Cited

U.S. PATENT DOCUMENTS 4,313,158  1/1982  Porter et al. ............................. 395/425
4,933,835  6/1990  Sachs et al. ............................. 395/425
5,313,613  5/1994  Gregor ..................................... 395/425

*Primary Examiner*—David C. Nelms
*Assistant Examiner*—Huan Hoang
*Attorney, Agent, or Firm*—Lee E. Chastain

[57] ABSTRACT

A memory cache (14) has a plurality of cache lines (50) for storing a series of contiguous memory elements. Each series of memory elements are interlaced within the corresponding cache line on a element-by-element basis and on a bit-by-bit basis. This storage strategy allows the memory cache to output a subset memory elements within a cache line quickly and in the original contiguous order. The invention may be advantageously incorporated in an instruction cache of superscalar data processor to provide a series of sequential instructions for execution.

16 Claims, 5 Drawing Sheets

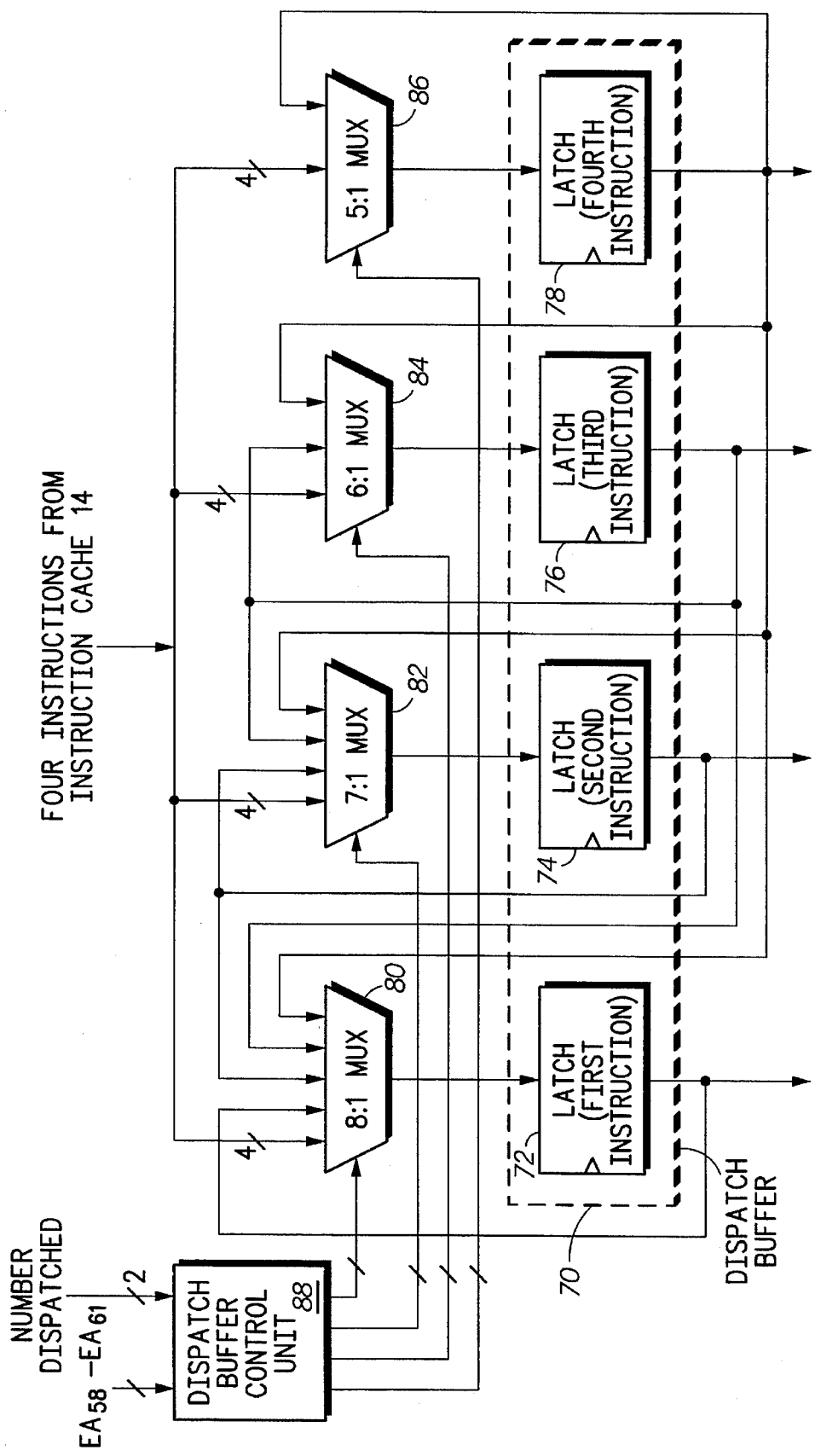

MEMORY CACHE WITH INTERLACED DATA AND METHOD OF OPERATION

FIELD OF THE INVENTION

The present invention generally relates to digital computing systems, and more specifically to memory caches.

BACKGROUND OF THE INVENTION

Modern data processors achieve much of their high performance by dispatching and executing more than one instruction at the same time, "superscalar" instruction execution. The implication of this design strategy is that these data processors must be able to fetch more than one instruction each clock cycle from their memory storage subsystem. Typically, high performance data processors buffer their instructions in an integrated memory cache for quick access.

Memory caches are often designed to output a group of sequential bytes when provided with an address of any byte in the group. These byte groups are referred to as "cache lines." This cache architecture is a compromise between data bandwidth, source address tagging, etc. For instance, a four-instruction-dispatch data processor may have a memory cache designed as a series of sixty-four byte cache lines. Each cache line could contain sixteen thirty-two bit (four-byte) instructions. Such a cache supplies an entire cache line whenever the data processor requires any single instruction in the cache line. However, a four-instruction-dispatch data processor only requires the four instructions beginning at the provided address each clock cycle. The first requested instruction may or may not be the first instruction in the output cache line. Therefore, such a data processor requires additional circuitry to select the four requested instructions within each output cache line. This additional circuitry slows the process of providing instructions for execution and is oftentimes a large circuit, raising the cost of the data processor.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIG. 5 depicts a block diagram of a portion of the sequencer unit depicted in FIG. 1.

DETAILED DESCRIPTION OF A PREFERRED EMBODIMENT

Figure 1:
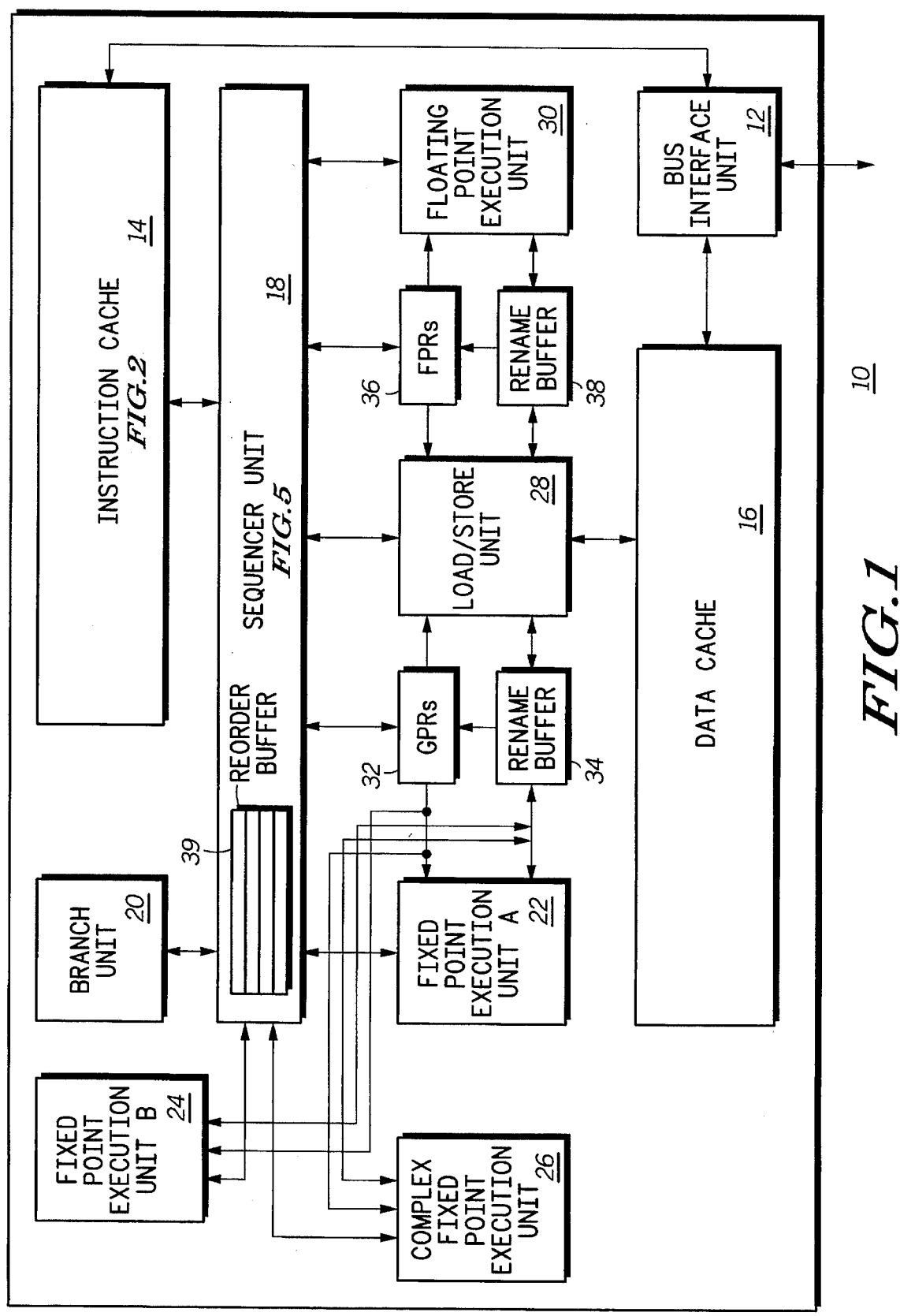
FIG. 1 depicts a block diagram of a data processor constructed in accordance with the present invention.

FIG. 1 depicts a block diagram of a data processor 10 constructed in accordance with the present invention. Data processor 10 dispatches up to four instructions each clock cycle to the various execution units within it for execution. Data processor 10 also incorporates an instruction cache in which it stores a group of recently used instructions. These instructions are grouped and manipulated in sets of sixteen contiguous instructions for high data bandwidth, efficient source address tagging, etc. The data cache generates an intermediate output of sixteen instructions each time any instruction within the group is requested of it, a cache line. The bits in each of the sixteen instructions are interlaced with the bits in each of the other fifteen instructions such that any four contiguous instructions may be quickly selected. The disclosed invention impacts the area of data processor 10 minimally.

Continuing with FIG. 1, a bus interface unit (hereafter BIU) 12 controls the flow of data between data processor 10 and the remainder of a data processing system (not depicted). BIU 12 is connected to an instruction cache 14 and to a data cache 16. Instruction cache 14 supplies an instruction stream to a sequencer unit 18. Sequencer unit 18 forwards individual instructions to an appropriate execution unit. Data processor 10 has a branch unit 20, a fixed point execution unit A 22, a fixed point execution unit B 24, a complex fixed point execution unit 26, a load/store execution unit 28, and a floating point execution unit 30. Fixed point execution unit A 22, fixed point execution unit B 24, complex fixed point execution unit 26, and load/store execution unit 28 read and write their results to a general purpose architectural register file 32, (labeled GPRs and hereafter GPR file) and to a first rename buffer 34. First rename buffer 34 is more fully described below in connection with FIGS. 3 and 4. Floating point execution unit 30 and load/store execution unit 28 read and write their results to a floating point architectural register file 36, (labeled FPRs and hereafter FPR file) and to a second rename buffer 38.

The operation of data processor 10 without the disclosed invention is known in the art. In general, branch unit 20 determines what sequence of programmed instructions is appropriate given the contents of certain data registers and the instructions themselves. Instruction cache 14 provides this sequence of programmed instructions to sequencer 18. If instruction cache 14 does not contain the required instructions, then it will fetch them from a main memory system external to data processor 10 (not shown).

Sequencer unit 18 dispatches the individual instructions of the sequence of programmed instructions to the various execution units 20, 22, 24, 26, 28 and 30. Sequencer unit 18 also reserves an entry in either rename buffer 34 or 38 in which to temporarily store the result, if any, of each instruction. Both rename buffers are first-in-first-out ("FIFO") queues.

Each of the execution units performs one or more instructions of a particular class of instructions. The particular class of instructions of each execution unit is indicated by the name of the execution unit. For instance, fixed point execution units A and B perform simple mathematical operations on operands expressed in fixed point notation such as addition, subtraction, ANDing, ORing and XORing. Complex fixed point execution unit 26 performs more complex mathematical operations on operands expressed in fixed point notation such as multiplication and division. Floating point execution unit 30 performs mathematical operations on operands expressed in floating point notation such as multiplication and division.

Fixed point execution units A and B and complex fixed point unit 26 return the results of their operations to designated entries in first rename buffer 34. First rename buffer 34 periodically updates an entry of GPR file 32 with an entry from first rename buffer 34 when all instructions preceding the instruction that generated the result have updated their GPR file entries. Sequencer unit 18 maintains a reorder buffer 39 to coordinate this updating. Reorder buffer 39 is a FIFO queue that stores a portion of the programmed instruction stream in its original order. Sequencer unit 18 waits until the oldest instruction in reorder buffer 39 has completed. Then, sequencer unit 18 updates the architectural register with the result stored in the rename buffer entry allocated for the instruction. Sequencer unit 18 also invalidates the instruction's entry in reorder buffer 39 to make room for later instructions. Both first rename buffer 34 and GPR file 32 can supply operands to fixed point execution units A and B and to complex fixed point unit 26.

Floating point execution unit 30 returns the results of its operations to designated entries in second rename buffer 38. Second rename buffer 38 periodically updates an entry of FPR file 36 with an entry in second rename buffer 38 when all instructions preceding the instruction that generated the result have updated their FPR file entries. Sequencer unit 18 also coordinates this updating. Both second rename buffer 38 and FPR file 36 supply operands to floating point execution unit 30.

Load/store unit 28 reads data stored in GPR file 32, or FPR file 36 at completion time and writes the selected data to data cache 16. This data may also be written to an external memory system (not depicted) depending upon operating characteristics of data processor 10 not relevant to the disclosed invention. Conversely, load/store unit 28 reads data stored in data cache 16 and writes the read data to first rename buffer 34 or second rename buffer 38. If data cache 16 does not contain the required data, then it will fetch it from the main memory system external to data processor 10 via BIU 12. Load/store unit 28 is described below in connection with FIGS. 3 through 14.

The operation of data processor 10 with the disclosed invention is described below in connection with FIGS. 2 through 4. In general, data processor 10 is a reduced instruction set computer ("RISC"). Data processor 10 achieves high performance by breaking each instruction into a sequence of smaller steps, each of which may be overlapped in time with steps of other instructions. This performance strategy is known as "pipe lining."

Figure 2:
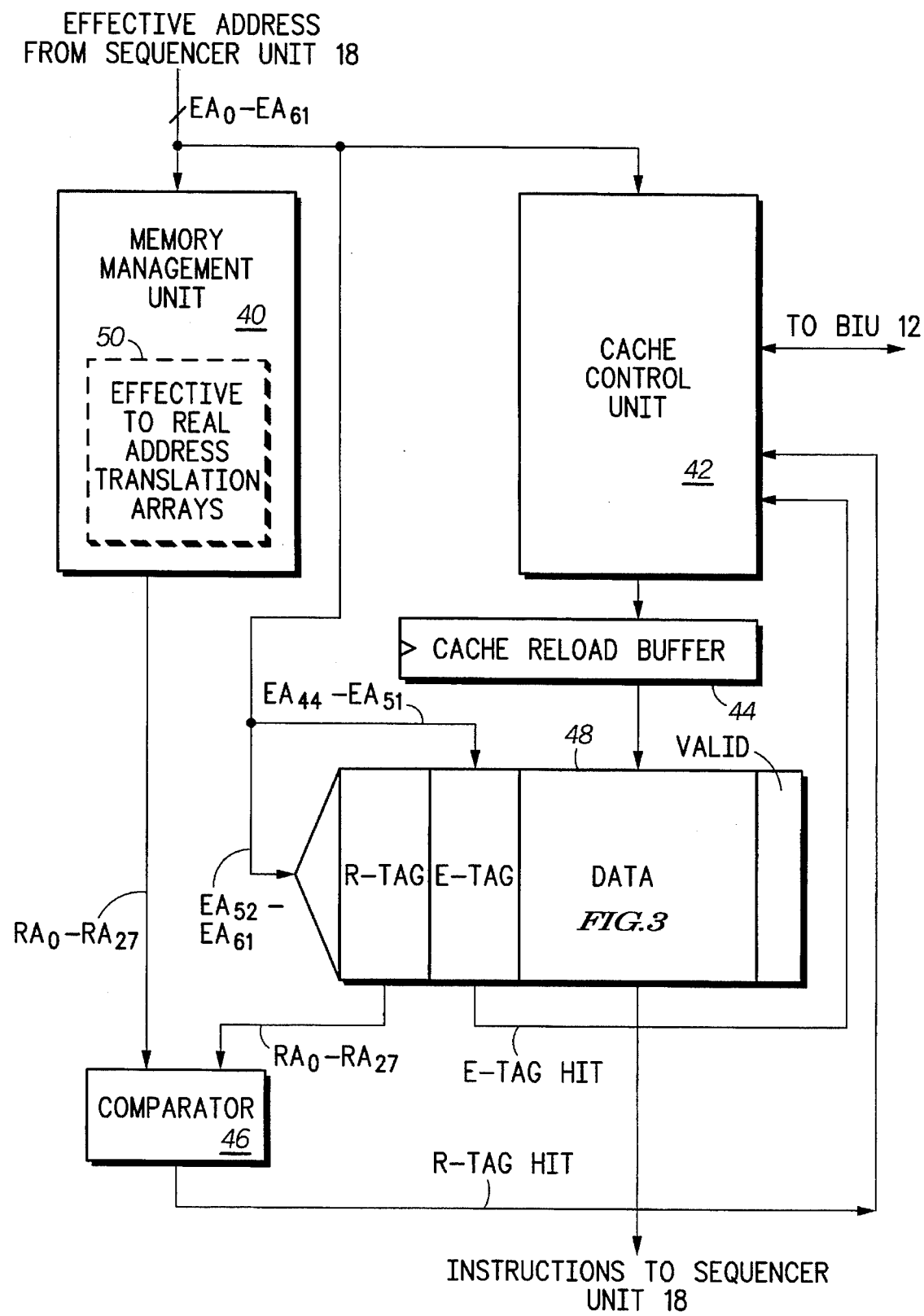
FIG. 2 depicts a block diagram of the instruction cache depicted in FIG. 1.

FIG. 2 depicts a block diagram of instruction cache 14 depicted in FIG. 1. Instruction cache 14 has a memory management unit (hereafter "MMU") 40, a cache control unit 42, a cache reload buffer (hereafter "CRB") 44, a comparator 66, and an instruction cache array (hereafter array) 48. MMU 40 contains one or more translation arrays 50 which it uses to map received effective addresses from sequencer unit 18 and branch unit 20 and to real addresses. In the depicted embodiment, the addresses of data and instructions are indexed within data processor 10 with a first addressing system, an "effective address." The same addresses are indexed outside of data processor 10 with a second addressing system, a "real address."

Array 48 is a semi-associative cache which acts like an eight-way set associative cache. Array 48 contains 512 cache lines that each store four quad-words of instructions (sixteen instructions). The 512 cache lines are organized into sixty-four camlets. Each camlet contains eight cache lines. Every four quad-words of data may be mapped into one of the eight different cache lines in a particular camlet. Each cache line in array 48 has an R-tag, an E-tag, four quad words of instruction/predecode bits (labeled "DATA") and a valid bit. The R-tag and DATA field are stored in static random access memory ("SRAM") bit cells. The E-tag and valid bits are stored in content addressable memory ("CAM") bit cells. Each R-tag stores the twenty-eight most significant bits of the real address of the cache line entry. (The R-tag may be implemented as a CAM device to facilitate external snoop operations.) Each E-tag stores eight bits of the effective address of the cache line entry. Each valid bit indicates whether or not the instructions stored in the cache line are valid.

In operation, instruction cache 14 receives a sixty-four bit effective address from sequencer unit 18 or branch unit 20 each clock cycle (the address does not always change between subsequent clock cycles). Instruction cache 14 only processes $EA_0$ through $EA_{61}$, most significant bit to least significant bit, because instructions in the depicted embodiment are always word aligned: $EA_{62}$ and $EA_{63}$ are zeros. This address indexes a single word (instruction) in the memory space of data processor 10. This single word and the three subsequent words (sixty bytes) contain the four sequential instructions requested by sequencer unit 18. MMU 40 translates the most significant bits of the effective address into the twenty-eight most significant bits ($RA_0$ through $RA_{27}$) of the corresponding real address ($RA_0$ through $RA_{39}$, most significant bit to least significant bit). Array 48 indexes into one camlet in array 48 with $EA_{52}$ through $EA_{57}$. Simultaneously, array 48 attempts to match $EA_{44}$ through $EA_{51}$ with one of the eight E-tags in the camlet.

If array 48 finds an E-tag match in the camlet (at most), then the matching E-tag asserts a control signal E-TAG HIT to cache control unit 42. Then, the associated cache line will output its sixteen instructions. Circuitry depicted in FIGS. 4 and 5 illustrate how the one instruction indexed by the input effective address and the three following ones are selected. At this point, the E-tag hit is only a possible hit. Comparator 46 determines if each E-tag hit is an actual cache hit. Comparator 46 receives $RA_0$ through $RA_{27}$ from MMU 40 and the contents of the R-tag from the matching cache line from array 48. Comparator 46 asserts a control signal R-TAG HIT if the two bit fields are identical, a cache hit. Comparator 46 de-asserts R-TAG HIT if the two bit fields differ, a cache miss. In this case, cache control unit 42 forwards a request for the four-quad words beginning at the forty-bit real address generated by concatenating $RA_0$ through $RA_{27}$ and $EA_{52}$ through $EA_{61}$ to BIU 12.

If array 48 does not find an E-tag match in the one camlet, then a cache miss occurs and no cache line will assert E-TAG HIT. No further computation is required. In this case, cache control unit 42 also forwards a request for the four-quad words beginning at the forty-bit real address generated by concatenating $RA_0$ through $RA_{27}$ and $EA_{52}$ through $EA_{61}$ to BIU 12.

Cache control unit 42 regulates the addition of data to array 48. As described above, cache control unit 42 forwards the address of sixteen instructions to BIU 12 after an E-tag or an R-tag miss. Eventually, BIU 12 returns the requested instructions to cache control unit 42 one quad word at a time. Cache control unit 38 writes the four quad words into CRB 44 along with the stored R-tag and the E-tag as it receives them. Cache control unit 42 then writes the entire contents of CRB 44 into a cache line of array 48. The timing of and circuits relating to this step of writing are described in an Application for U.S. Patent entitled "Memory Cache and Method of Operation," Ser. No. 08/176,812, filed Jan. 3, 1994, to Barrera et al. The contents of that application are incorporated herein by reference.

Cache control unit 42 does not write the received instruction bits into CRB 44 and array 48 in the same order in which it received them from the external memory system (not shown). Instead, cache control unit 42 interlaces the sixteen instructions and the various bits of each of the instructions when it writes the data into CRB 44. Data processor 10 is constructed using a multi-layer metal complementary metal oxide semiconductor process. Therefore, this interlacing can be accomplished by advantageously placing the interconnecting vias between the data input path (one metal layer) and the data bit lines of array 48 (another metal layer). The details of the instruction bit interlacing are described below.

Figure 3:
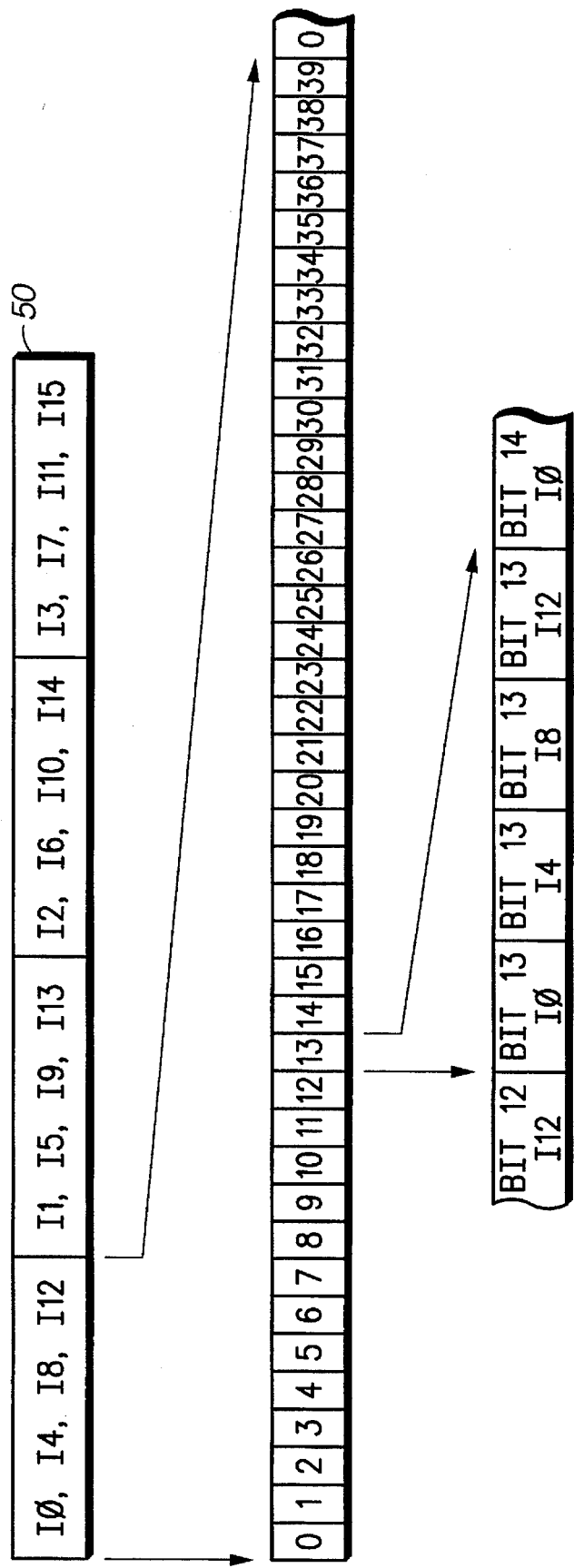
FIG. 3 depicts, in detail, the bit mapping of a cache line.

FIG. 3 depicts, in detail, the bit mapping of a cache line 50. FIG. 3 only depicts the data field of each cache line. The E-tag, R-tag and valid bit fields need not be interlaced. As described above, array 50 contains 512 cache lines grouped in sixty-four camlets. Each cache line contains sixteen four-byte instructions and sixteen single bytes of pre-decoded instruction data: one byte per instruction. In the depicted embodiment, the first byte in each cache line is quad-quad-word aligned. A quad-quad-word aligned address contains zeros in its six least significant address bit positions.

In general, a cache line that outputs A contiguous instructions may be conceptually divided into A sections of B interlaced instructions each, where A and B are integers, if the cache line size is evenly divisible by A. Otherwise, the cache line may be divided into D sections of B instructions each and (A–D) sections of B-1 instructions each, where D is an integer equal to the remainder of the cache lines size divided by A. The B or B-1 instructions within a single section are further interlaced on a bit-by-bit basis. Specifically, the Ith bit of each of the B instructions within a section are grouped together forming the Ith subsection, where I is an integer index ranging from zero to the number of instruction bits less one. As a consequence of the double interlacing of instructions and instruction bits, the Ith subsection in the Kth section contains the Ith bit of the 0*A+K, 1*A+K, 2A+K, . . . , (B–1–P)*A+K instructions, where K is an integer index ranging from zero to A-1, and where P is a "partially populated" function. P has the value of 0 for all sections having B instructions and a value of 1 for all sections having B-1 instructions. The B or B-1 bits within the Ith subsection are ordered sequentially starting with the instruction having the lowest address and ending with the instruction having the highest address. It should be understood that this ordering is not necessary to practice the disclosed invention.

In the depicted embodiment, the cache line size is evenly divisible by the number of output instructions. Therefore, each cache line is divided into four (A) sections of four (B) interlaced instructions each. Each one of the four instructions within a section is also interlaced on a bit-by-bit basis. Each instruction contains thirty-two bits plus eight pre-decode bits. Therefore, each section contains forty subsections of four bits each. As depicted in FIG. 3, the fourteenth subsection (labeled thirteenth when starting from zero) in the first section contains the fourteenth bit of the zeroth, fourth, eighth, and twelfth instructions.

Figure 4:
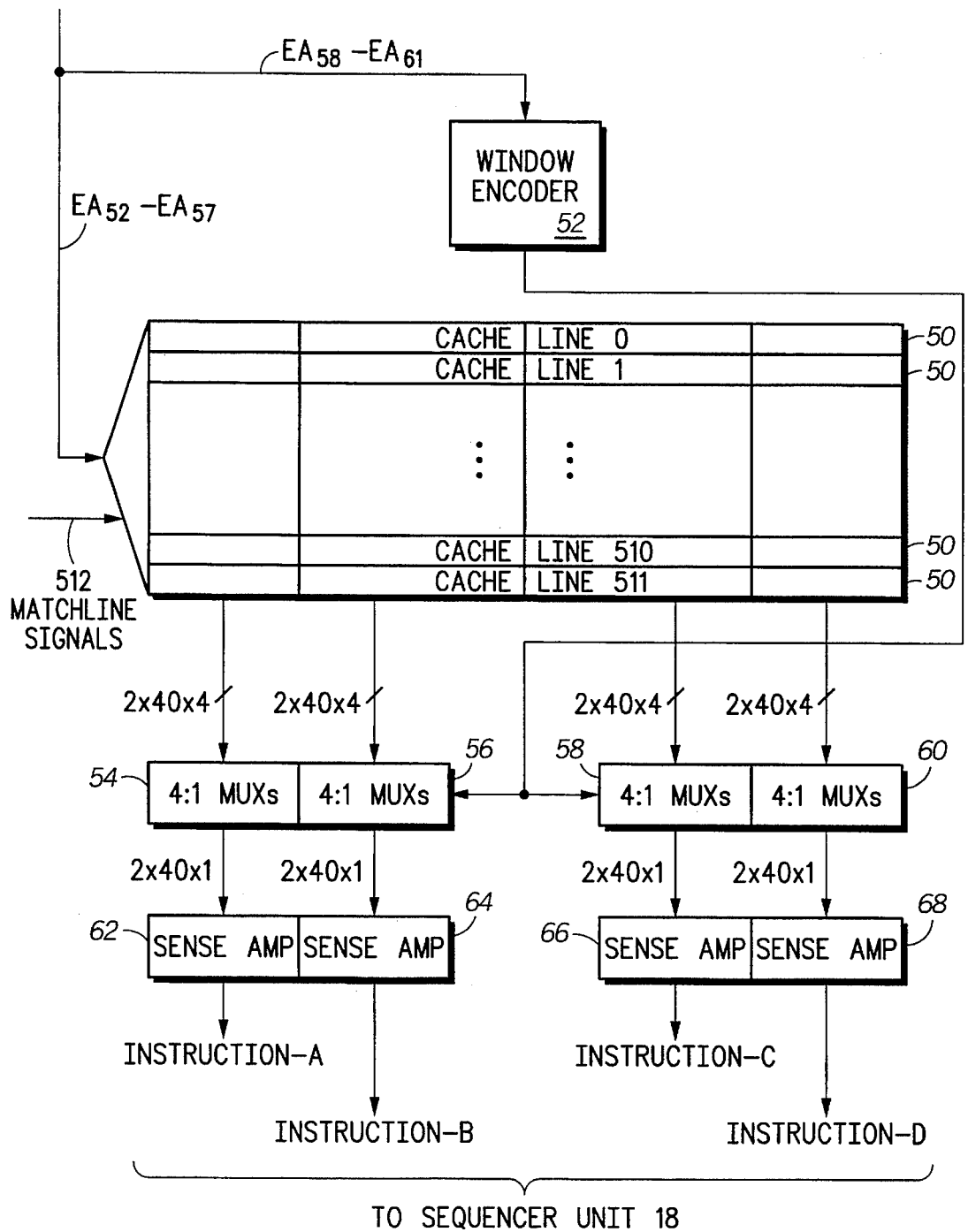
FIG. 4 depicts a block diagram) of the instruction cache array depicted in FIG. 2.

FIG. 4 depicts a block diagram of array 50 depicted in FIG. 2. In order to highlight the disclosed invention, FIG. 2 excludes that portion of array 50 related to R-tag, E-tag, and valid bit fields. Array 48 contains a block of 512 cache lines 50. Six effective address bits $EA_{52}$ though $EA_{57}$ select one camlet of eight cache lines 50. Each of the 512 cache lines 50 also receives a differing one of 512 matchline signals generated by the cache line's corresponding E-tag field. The two sets of inputs select one or none of the 512 cache lines 50. A window encoder 52 receives the four least significant bits of the effective address, $EA_{58}$ though $EA_{61}$. Four 4:1 forty-bit multiplexers (labeled "4:1 MUXs") 54, 56, 58, and 60 select the requested four instructions responsive to the output of window encoder 52. Each one of multiplexers 54, 56, 58, and 60 select one instruction from one of the A sections in array 48. For instance, multiplexer 56 selects instruction 15 from the second section of the selected cache line if the four least significant bits of the effective address, $EA_{58}$ though $EA_{61}$ correspond to one, two, three, four, or five (decimal). Conversely, multiplexer 56 selects instruction 16 from the second section of the selected cache line if the four least significant bits of the effective address correspond to two, three, four, five, or six (decimal), etc.

Four sense amplifiers (labeled "SENSE AMP") 62, 64, 66, and 68 buffer the dual-ended voltage levels output by the four sections of selected cache line 50. The interlacing of instruction bits in array 48 and the placement of multiplexers 54, 56, 58, and 60 reduce the overall routing of the instruction data path in data processor 10. This result conserves area and improves processor clock speed by reducing circuit capacitance. The output of sense amplifiers 62, 64, 66, and 68 are routed to sequencer unit 18 where they are dispatched to the various execution units as described above. It should be understood that in only four cases in sixteen will the four selected instructions be in the original program order. Consequently, the four selected instructions are labeled A, B, C, and D at this stage to indicate their likely mis-ordering.

FIG. 5 depicts a block diagram of a portion of sequencer unit 18 depicted in FIG. 1. Sequencer unit 18 contains a dispatch buffer 70 from which it dispatches up to four instructions to four execution units each clock cycle in the original program order. The number of dispatched instructions depends upon the availability of the various execution units each clock, to the instructions themselves, and to other factors. Dispatch buffer 70 itself contains four latches 72, 74, 76, and 78 which latch the four instructions eligible for dispatch each clock cycle.

Latches 72, 74, 76, and 78 latch the four instructions eligible for dispatch in the original program order. Therefore, latches 72, 74, 76, and 78 receive four instructions via an output of four multiplexers 80, 82, 84, and 86, respectively. Multiplexers 80, 82, 84, and 86 receive the four instructions A, B, C, and D from instruction cache 14. A dispatch buffer control unit 88 selects which of the four instructions must be routed to which multiplexer to recreate the original program order, i.e. first instruction to the leftmost eligible latch, second instruction to the second leftmost eligible latch, etc. Dispatch buffer control unit 88 receives the four effective address bits $EA_{58}$ through $EA_{61}$ to accomplish this new-instruction-reordering function.

Dispatch buffer 70 does not always dispatch four instructions each clock cycle. Therefore, dispatch buffer 70 must also be able to shift undispatched instructions from the latter part of the dispatch window to the beginning of the dispatch window (or from right latch to left latch). Multiplexer 80 also receives the output of latches 72, 74, 76, and 78. Multiplexer 82 receives the output of latches 74, 76, and 78. Multiplexer 84 receives the output of latches 76 and 78. Multiplexer 86 receives the output of latch 78. Dispatch buffer control unit 88 receives a NUMBER DISPATCHED control signal generated by another portion of sequencer unit 18 indicating the number of instructions dispatched in the previous cycle to accomplish this old-instruction-shifting function.

It should be understood that dispatch buffer control unit 88 performs its new-instruction-reordering and old-instruction-shifting functions simultaneously. If sequencer unit 18 dispatched no instructions in the pervious cycle, then dispatch buffer control unit 88 writes the contents of each latch back into itself. If the sequencer unit 18 dispatched one instruction in the pervious cycle, then dispatch buffer control unit 88 writes the first instruction into latch 78, rotates the instruction stored in latch 78 into latch 76, rotates the instruction stored in latch 76 into latch 74, and rotates the instruction stored in latch 74 into latch 72. If sequencer unit 18 dispatched two instructions in the pervious cycle, then dispatch buffer control unit 88 writes the second instruction into latch 78, writes the first instruction into latch 76, rotates the instruction stored in latch 78 into latch 74, and rotates the instruction stored in latch 76 into latch 72. If sequence unit 18 dispatched three instructions in the pervious cycle, then dispatch buffer control unit 88 writes the third instruction into latch 78, writes the second instruction into latch 76, writes the first instruction into latch 74, and rotates the instruction stored in latch 78 into latch 72. If sequencer unit 18 dispatched four instructions in the pervious cycle, then dispatch buffer control unit 88 writes the fourth instruction into latch 78, writes the third instruction into latch 76, writes the second instruction into latch 74, and writes the first instruction into latch 72.

Although the present invention has been described with reference to a specific embodiment, further modifications and improvements will occur to those skilled in the art. For instance, the disclosed invention may stand alone or may be incorporated into data processors traditionally classified as complex instruction set computers or CISC machines. The disclosed invention may be used in a data or a unified cache. Also, certain functional units may be omitted in certain embodiments or relocated to other areas of instruction cache 14. It is to be understood therefore, that the invention encompasses all such modifications that do not depart from the spirit and scope of the invention as defined in the appended claims.

We claim:

1. A memory cache outputting a subset of one of a plurality of contiguous memory elements responsive to an address, the memory cache comprising:

a plurality of cache lines, each one of the plurality of cache lines storing one of the plurality of contiguous memory elements, each one of the plurality of contiguous memory elements comprising a plurality of bits, each one of the plurality of contiguous memory elements interlaced at an element level and at a bit level in the each one of the plurality of cache lines, a "set of interlaced memory elements," the plurality of cache lines outputting the set of interlaced memory elements responsive to the address;

a first plurality of switching means coupled to the plurality of cache lines, a differing one of the first plurality of switching means receiving a differing subset of the set of interlaced memory elements and outputting one memory element of the subset of the one of the plurality of contiguous memory elements responsive to the address; and a second plurality of switching means coupled to the first plurality of switching means, each one of the second plurality of switching means receiving the subset of the one of the plurality of contiguous memory elements, each one of the second plurality of switching means outputting a differing memory element of the subset of the one of the plurality of contiguous memory elements responsive to the address.

2. The memory cache of claim 1 wherein tho differing memory element of the subset of the one, of the plurality of contiguous memory elements comprises an instruction.

3. A memory cache outputting A contiguous elements from a memory space responsive to an address, the memory cache comprising:

a plurality of cache lines comprising A sections, the plurality of cache lines outputting one of the plurality of cache lines responsive to a first subset of the address, each one of the plurality of cache lines storing E contiguous elements from the memory space, each one of the E contiguous elements comprising C bits, each one of the A sections comprising C subsections of either B or (B-1) adjacent bits, an Ith subsection in a Kth section storing an Ith bit of a (0*A+K)th, a(1*A+K)th, a(2*A+ K)th, a (. . .)th, and a ((B−1−P)*A+K)th one of the E contiguous elements, a "set of interlaced elements," where A, B, C, I, K, E, and P are integers, where B is a ratio of (E/A) rounded to a next higher integer, where I is an index ranging from zero to C-1, where K is an index ranging from zero to A-1, where P equals zero if a remainder of (E/A) is zero or if K is less than a non-zero remainder of (E/A), and where P equals one if K is greater than or equal to the non-zero remainder of (E/A);

a first set of C-bit switching means, each switching means of the first set of C-bit switching means receiving the interlaced elements from a differing one of the A sections, each switching means of the first set of C-bit switching means outputting an element responsive to a second subset of the address; and a second set of C-bit switching means, each switching means of the second set of C-bit switching means receiving the element from each one of the first set of C-bit switching means, each switching means of the second set of C-bit switching means outputting a differing one of A elements responsive to a third subset of the address, an order of the A elements output by the second set of C-bit switching means equivalent to an order of the A elements in the memory space.

4. The memory cache of claim 3 wherein each one of the A elements comprises an instruction.

5. The memory cache of claim 4 wherein each one of the plurality of cache lines further comprises a tag storage means for storing a tag logically equivalent to a third subset of the address.

6. The memory cache of claim 5 further comprising:

A latches coupled to a differing one of the second set of C-bit switching means, each one of the A latches receiving a differing one of the A elements; and wherein a Jth one of the second set of C-bit switching means receives an output of a zeroth through Jth one of the A latches, where J is an integer index ranging from zero to A-1.

7. The memory cache of claim 3 wherein each one of the plurality of cache lines further comprises a tag storage means for storing a tag logically equivalent to a third subset of the address.

8. The memory cache of claim 7 further comprising:

A latches coupled to a differing one of the second set of C-bit switching means, each one of the A latches receiving a differing one of the A elements; and wherein a Jth one of the second set of C-bit switching means receives the output of the zeroth through Jth ones of the A latches, where J is an integer index ranging from zero to A-1.

9. The memory cache of claim 3 further comprising:

A latches coupled to a differing one of the second set of C-bit switching means, each one of the A latches receiving a differing one of the A elements; and wherein a Jth one of the second set of C-bit switching means receives the output of the zeroth through Jth ones of the A latches, where J is an integer index ranging from zero to A-1.

10. A method of operating a memory cache comprising the steps of:

receiving an address in a plurality of cache lines, the address indexing an initial memory element in a memory space, the initial memory element being a first one of a series of A contiguous memory elements, each one of the plurality of cache lines comprising A sections, each one of the plurality of cache lines storing E contiguous elements from the memory space, each one of the E contiguous elements comprising C bits, each one of the A sections comprising C subsections of either B or (B-1) adjacent bits, an Ith subsection in a Kth section storing an Ith bit of a (0*A+K)th, a (1*A+K)th, a (2*A+ K)th, a (. . .)th, and a ((B−1−P)*A+K)th one of the E contiguous elements, where A, B, C, I, K, E, and P are integers, where B is a ratio of (E/A) rounded to a next higher integer, where I is an index ranging from zero to C-1, where K is an index ranging from zero to A-1, where P equals zero if a remainder of (E/A) is zero or if K is less than a non-zero remainder of (E/A), and where P equals one if K is greater than or equal to the non-zero remainder of (E/A);

first selecting one of the plurality of cache lines responsive to the address;

second selecting A memory elements of the set of interlaced elements; and reordering the A memory elements such that an order of the A memory elements is equivalent to the series of A contiguous memory elements.

11. The method of claim 10 wherein the step of receiving comprises the step of receiving an address in a plurality of cache lines, the address indexing an instruction in a memory space.

12. The method of claim 11 wherein the step of first selecting further comprises the step of comparing a tag associated with the one of the plurality of cache lines and a portion of the address.

13. The method of claim 12 wherein the step of reordering further comprises the step of latching the A contiguous elements in A latches, each one of the A latches receiving an output of a differing one of A switching means, a Jth one of A switching means receiving an output of a zeroth through Jth ones of the A latches, where J is an integer index ranging from zero to A-1, and the set of interlaced elements.

14. The method of claim 10 wherein the step of first selecting further comprises the step of comparing a tag associated with the one of the plurality of cache lines and a portion of the address.

15. The method of claim 14 wherein the step of reordering further comprises the step of latching the A contiguous elements in A latches, each one of the A latches receiving an output of a differing one of A switching means, a Jth one of A switching means receiving the output of the zeroth through Jth ones of the A latches, where J is an integer index ranging from zero to A-1, and the set of interlaced elements.

16. The method of claim 10 wherein the step of reordering further comprises the step of latching the A contiguous elements in A latches, each one of the A latches receiving an output of a differing one of A switching means, a Jth one of A switching means receiving the output of the zeroth through Jth ones of the A latches, where J is an integer index ranging from zero to A-1, and the set of interlaced elements.

* * * * *